Dec. 1, 1931.         C. A. BOATMAN         1,834,821
COMBINATION ADJUSTABLE DRIVING SPOT AND TROUBLE LIGHT
Filed Aug. 1, 1930         2 Sheets-Sheet 1
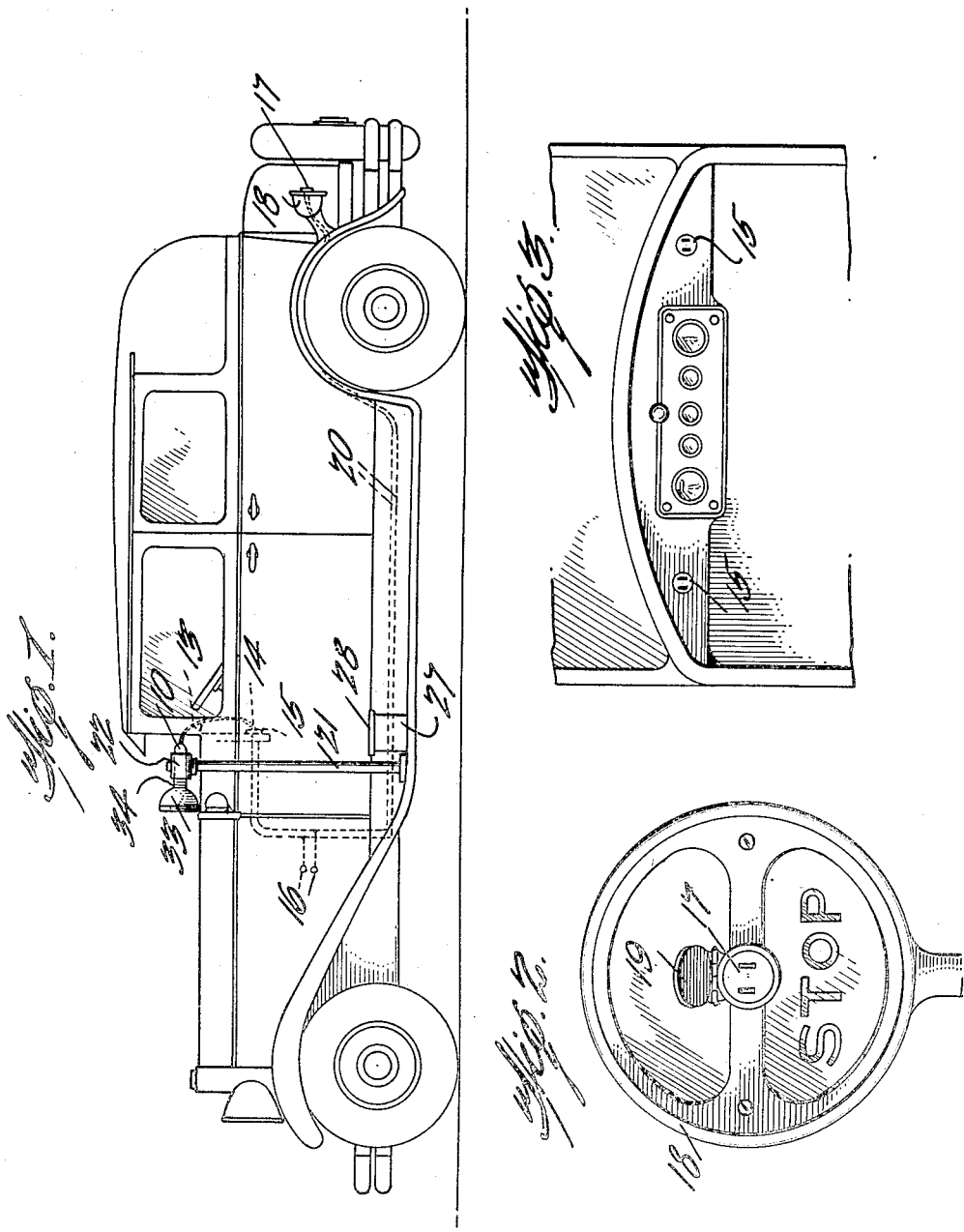

Dec. 1, 1931.  C. A. BOATMAN  1,834,821
COMBINATION ADJUSTABLE DRIVING SPOT AND TROUBLE LIGHT
Filed Aug. 1, 1930   2 Sheets-Sheet 2
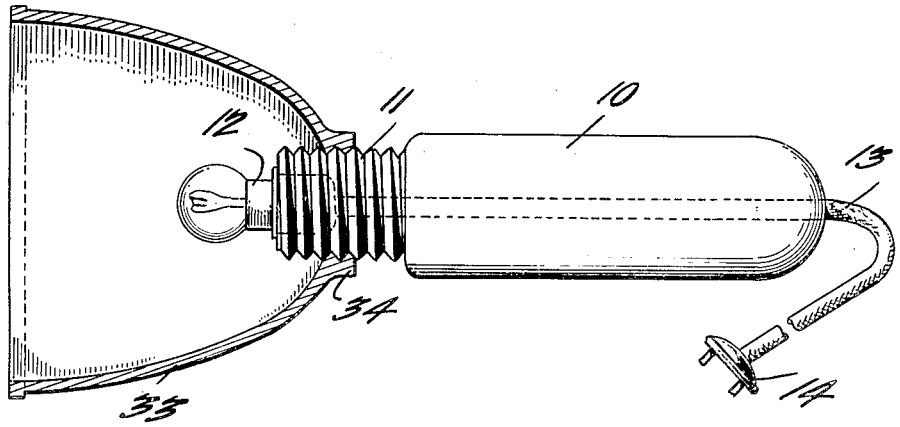
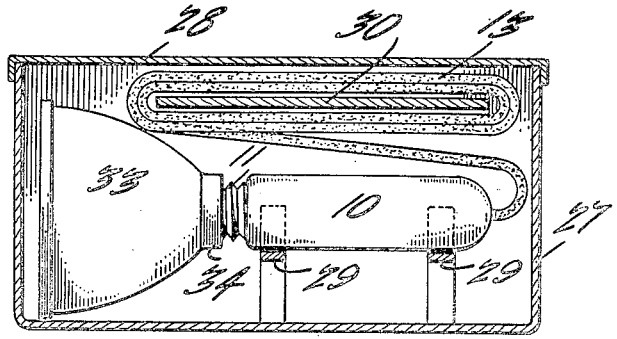
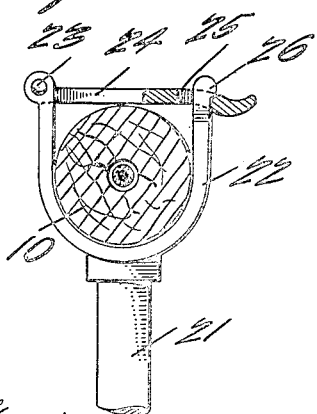
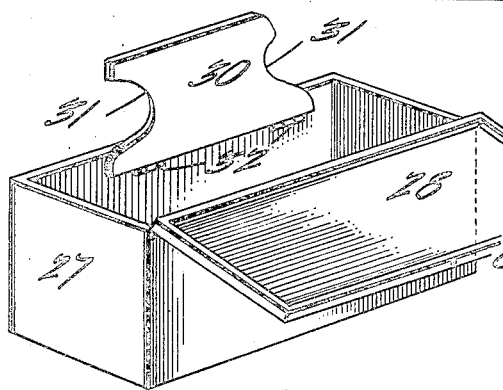
CHARLES A. BOATMAN
INVENTOR
BY Victor J. Evans
ATTORNEY Patented Dec. 1, 1931

1,834,821

UNITED STATES PATENT OFFICE

CHARLES ALBERT BOATMAN, OF WATERLOO, IOWA

COMBINATION ADJUSTABLE DRIVING SPOT AND TROUBLE LIGHT

Application filed August 1, 1930. Serial No. 472,422.

This invention relates to automobile accessories and has for an object the provision of a combined spot and trouble lamp which may be used upon the ditch side of the road when driving at night, and for locating signs, buildings, etc., and which in addition is also useful as a trouble lamp.

Another object of the invention is the provision of means for mounting the lamp so that it may be used as a driving light, and for plugging the lamp in at various points within and around the automobile for convenient use as a trouble lamp.

Another object of the invention is the provision of a lamp of simple construction which is capable of ready adjustment to project the light rays directly ahead for a considerable distance to locate a spot or object, or to diffuse said rays when driving to eliminate blinding beams.

With the above and other objects in view, the invention further includes the following novel features and details of construction, to be hereinafter more fully described, illustrated in the accompanying drawings and pointed out in the appended claim.

In the drawings:—

Figure 1 is a side elevation of an automobile illustrating the invention.

Figure 2 is an elevation of the tail light.

Figure 3 is a fragmentary view illustrating the instrument board and plug sockets carried thereby for plugging in the lamp.

Figure 4 is an enlarged elevation of the lamp with the reflector shown in section.

Figure 5 is a sectional view of a receptacle with the lamp in position therein.

Figure 6 is a perspective view of the receptacle with the panel in raised position and parts broken away.

Figure 7 is a fragmentary view partly in section showing the manner of clamping the lamp in position for use as a driving element.

Referring to the drawings in detail wherein like characters of reference denote corresponding parts, the reference character 10 indicates the handle of the lamp which is shown as cylindrical and which is provided at one end with a threaded extension 11. This extension carries an electric bulb 12 which is electrically connected with a cable or cord 13, the latter carrying a plug 14, whereby the lamp may be plugged into an electric circuit.

Sockets to receive the plug 14 are located at various places in and around the automobile. For example, sockets 15 are located at opposite sides of the instrument board of the vehicle, while sockets 16 are located beneath the hood. In addition, a socket 17 is carried by the automobile tail light 18 so that the lamp may be plugged in at the rear of the automobile for use in changing rear tires, and for other purposes. The socket 17 is provided with a hinged cover 19 which is normally closed to keep out water. The sockets 15, 16 and 17 are in electrical connection with the automobile battery through the medium of suitable conductors 20.

Various means may be employed for mounting the lamp for use as a driving light. The means shown consists of a post 21 which rises from the running board of the automobile and which is provided at its upper end with a saddle 22 to receive the handle 10. This saddle is made of resilient material and has hinged thereto as shown at 23, a strap 24. This strap is provided with an opening 25 to receive a projection 26 at the upper edge of one side of the saddle so that the handle may be securely held in place.

In order to conveniently house the lamp when not in use, the invention provides a receptacle 27. This receptacle is provided with a hinged cover 28 and with spring clips 29 which are located inside of the receptacle. These clips receive the handle 10 of the lamp.

Located within the receptacle above the clips 25 is a panel 30. This panel is notched at its opposite end as shown at 31 and the conductor cord 13 is wound upon this panel within these notches. The panel is hingedly mounted to the inside wall of the box as shown at 32, the hinges being so arranged that when the panel is positioned as shown in Figure 5 of the drawings, it will be held against further downward movement. The panel however may be readily swung upward to the position shown in Figure 6 for the convenient removal of the lamp.

The lamp is provided with a reflector 33 and this reflector is provided with an interiorly threaded collar 34 which receives the reduced threaded extremity 11 of the handle 10 as shown in Figure 4 of the drawings. The reflector 33 may thus be threadedly adjusted upon the handle 10 and when so adjusted will be moved with respect to the bulb 12. By moving the reflector outward, the light's rays will be concentrated so as to project the said rays for a considerable distance, while inward adjustment of the reflector will spread or diffuse the rays and eliminate blinding glare when the lamp is used as a driving lamp.

The invention is susceptible of various changes in its form, proportions and minor details of construction and the right is herein reserved to make such changes as properly fall within the scope of the appended claim.

Having described the invention what is claimed is:—

In combination, a lamp including a handle, an electric conductor cord extending therefrom, a threaded portion at one end of said handle, an electric bulb carried by the threaded end of the handle and being electrically connected with one end of the conductor cord, plug socket means on the vehicle to electrically connect said bulb with a source of current, a reflector extending from the threaded end of the handle and having a threaded opening to receive the threaded end whereby the reflector may be adjusted axially, a plug carried at the other end of the conductor cord and having detachable connection with the plug socket means, a receptacle, spaced spring grips within the receptacle to yieldably grip the handle and hold the lamp against accidental relative movement, and a cord carrying panel having one end hingedly secured to one side of the receptacle to dispose said panel horizontally above the grips and permit the panel to be swung upward to remove and replace the lamp with respect to the receptacle.

In testimony whereof I affix my signature.

CHARLES ALBERT BOATMAN.